United States Patent [19]
Ditzler

[11] Patent Number: 5,968,352
[45] Date of Patent: Oct. 19, 1999

[54] GAS CONTACT TANK

[75] Inventor: Lee C. Ditzler, Diablo, Calif.

[73] Assignee: Novazone, Livermore, Calif.

[21] Appl. No.: 09/169,570

[22] Filed: Oct. 9, 1998

[51] Int. Cl.[6] .................................. C02F 1/78; B01F 3/04; B01F 15/02

[52] U.S. Cl. .......................... 210/220; 210/120; 210/123; 210/205; 261/76; 261/77; 261/126; 261/121.1; 261/DIG. 42; 261/DIG. 75

[58] Field of Search ...................................... 210/220, 120, 210/123, 205; 261/121.1, 126, 76, 77, DIG. 42, DIG. 75

[56] References Cited

U.S. PATENT DOCUMENTS 2,793,185  5/1957  Albrektsson .
5,302,298  4/1994  Leitzke .

FOREIGN PATENT DOCUMENTS 694918  7/1953  United Kingdom .

*Primary Examiner*—Thomas M. Lithgow
*Attorney, Agent, or Firm*—Townsend and Townsend and Crew LLP

[57] ABSTRACT

Intimate contact of water with a treatment gas is achieved by mixing the gas and water co-currently in a conduit containing static mixers, and directing the conduit into a gas contact apparatus that contains coaxial inner and outer tanks, the inner tank being open within, and shorter than, the outer tank, leaving a head space above the top of the inner tank. The conduit discharges the gas-water mixture at the base of the interior of the inner tank, permitting the water to flow upward through the annular space between the inner tank and the conduit, then over the weir formed by the open upper end of the inner tank and downward through the annular space between the inner and outer tanks. Gas is separated from the water at the head space, and treated degasified water leaves the apparatus at the base of the outer tank.

11 Claims, 1 Drawing Sheet

GAS CONTACT TANK

This invention relates to gas-liquid contacting systems, and in particular to systems for the treatment of liquids with gases that are marginally soluble in the liquids.

BACKGROUND OF THE INVENTION

Gas-liquid contacting systems exist in a wide variety of forms, depending on the function of the system, such as distillation, flashing, rectification, absorption, stripping, evaporation, humidification, and drying, and on the flow rates of gas and liquid through the system, as well as other parameters of the system. Many systems, such as ozonization systems for water, can be performed in relatively simple gas contact tanks without the need for plates, packings, or complex construction. These gas contact tanks can accommodate a high volume of water with low capital investment and low maintenance.

When treating water with ozone or any such gas that is marginally soluble in water, the critical parameters in achieving an effective treatment are (a) a high degree of mixing to maximize the contact between the gas and the water and (b) the duration of contact. Ozone is a prime example of a treatment agent where extensive mixing and an extended contact time are important in achieving effective treatment. For drinking water, the Environmental Protection Agency has established standards for the "CT" value, which is the product of the ozone concentration in the water in parts per million and the treatment time in minutes. The standard minimum value of CT ranges from 1 to 10 depending on the particular organisms to be destroyed in the water.

Contact tanks of the prior art are generally designed for counter-current flow with ozone gas bubbling up from the bottom of the tank while water enters at the top of the tank and leaves at the bottom. The contact efficiency of these tanks is approximately 50% at water depths above fifteen feet (4.6 meters) and water temperatures between 50° F. (10° C.) and 80° F. (27° C.). The low efficiency is due to a significant amount of bypass of the water flow in these tanks. As a result, the gas-liquid contact is not uniform throughout the tank and is difficult to measure or control.

SUMMARY OF THE INVENTION

The present invention resides in a contact tank for treating water with a gaseous agent of marginal solubility (of which ozone is one example), which overcomes problems of contact tanks of the prior art. The tank of this invention produces co-current flow of the gas and liquid, with extensive mixing, extended contact time and the virtual elimination of by-pass flow. To achieve this, the tank is constructed of coaxial inner and outer tanks, both being elongated vertical cylinders. A gas injector (such as, in the case of ozone, an ozone generator and eductor) is positioned external to both tanks, and the gas-injected water enters a fluid flow conduit which enters both tanks, passes down through the inner tank along its axis and discharges the water at the bottom of the inner tank to flow upwards within the inner tank around the conduit. Static mixers in the conduit serve to increase the contact area and mixing efficiency between the treatment gas and the water. The upper end of the inner tank opens into a head space in the outer tank where the treated water is degassed, while the upper edge of the inner tank serves as a weir over which the degassed water flows into the annular space between the two tanks, passing downward to the bottom of the outer tank and out. A gas releasing valve releases gas from the head space in a controlled manner to maintain the water level in the outer tank at a selected height. Optional features of the construction include a recycle loop to draw a portion of the treated water emerging from the annular space back to the conduit upstream of the static mixers, and a gas decomposition unit (for example in the case of ozone, an ozone destruction unit) in the vent line from the head space.

Further features, embodiments, objects and advantages of the invention will be apparent from the description that follows.

BRIEF DESCRIPTION OF THE DRAWING

The sole FIGURE accompanying this specification is a depiction in cross section of a gas contact tank in accordance with this invention for treating water with ozone.

DETAILED DESCRIPTION OF THE INVENTION AND PREFERRED EMBODIMENTS

Figure 1:
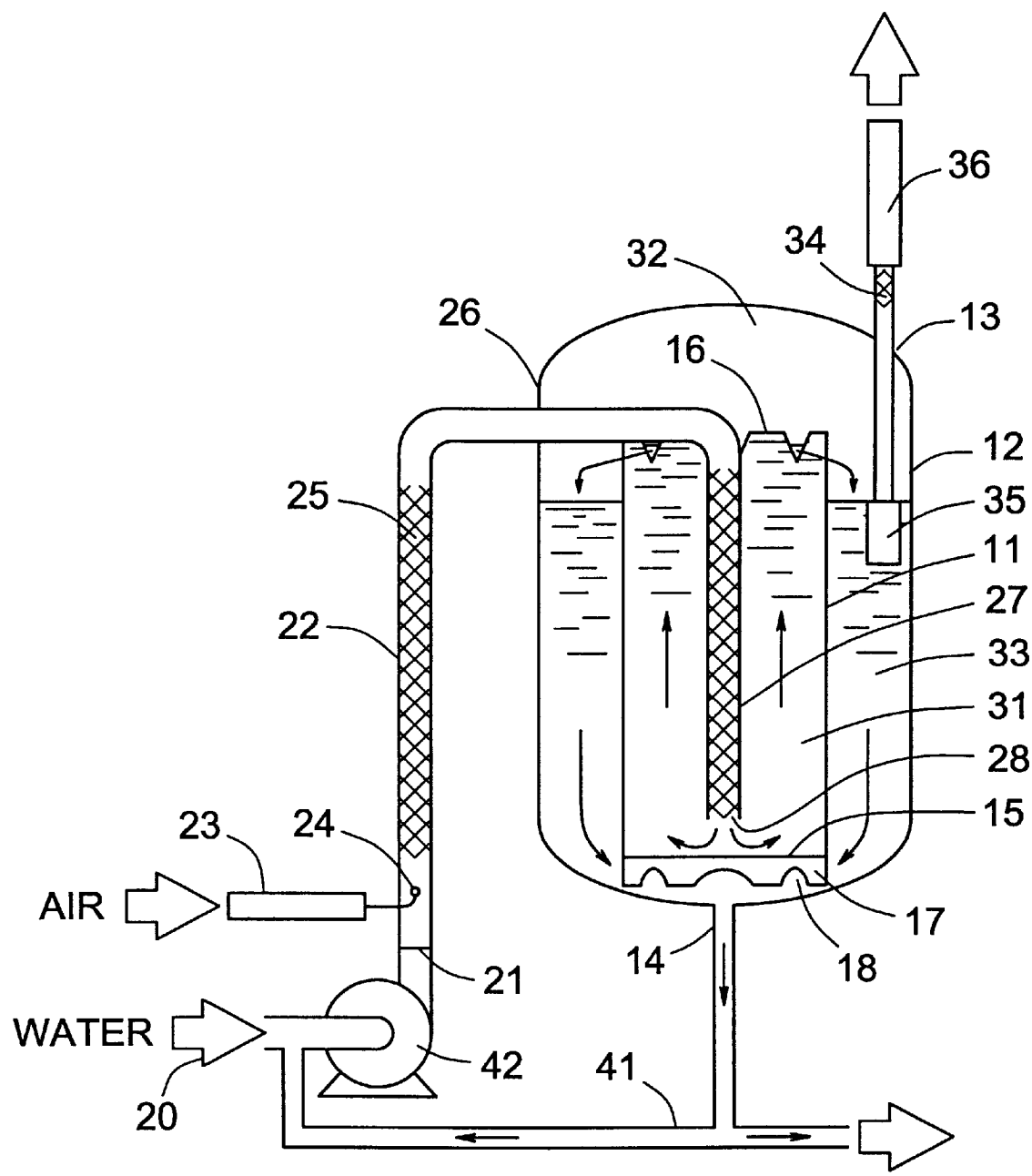

The gas contact tanks of this invention are capable of many variations in their design and construction, in the choices of their component parts, and the manner in which these parts are incorporated into the tank construction. A detailed examination of one embodiment will provide an understanding of the invention as a whole. Such an embodiment is shown in the attached drawing.

Shown in cross section in the drawing are the inner tank 11 and the outer tank 12, both of which are circular, cylinders that are coaxially arranged with axes oriented vertically. The outer tank 12 is domed at its top and bottom to improve its ability to withstand elevated internal pressures. The outer tank is closed at top and bottom except for a gas release port 13 at the top and a water outlet port 14 at the bottom. The inner tank 11 is closed at the bottom 15 and open at the top 16, and is shorter than the outer tank so that water rising within the inner tank will overflow into the outer tank. The bottom 15 of the inner tank is supported by a skirt 17 to raise the inner tank above the floor of the outer tank, the skirt containing openings 18 to permit water to flow underneath to the water outlet port 14 located at the center of the floor of the outer tank.

Water to be treated 20 enters the system at the inlet 21 of an external conduit 22. Ozone, generated by an ozonator 23 is injected into the entering water through a venturi 24. The ozone-water mixture flows through the external conduit 22 which is equipped with internal static mixers 25. The conduit enters the tanks by passing through the outer tank wall 26 at a location toward the upper end of the outer tank. The conduit section inside the outer tank extends to the center of the tank interior, where it is joined to a vertical internal conduit section 27 positioned along the common axis of the two tanks. The vertical internal conduit section extends from the open top 16 of the inner tank down the tank axis to toward the floor 15 of the inner tank, terminating at an open end 28 located a short distance above the floor to provide clearance for the discharge of the ozone-water mixture from the conduit into the interior of the inner tank 11.

Upon leaving the open end 28 of the conduit, the ozone-water mixture diverges radially into the annular space 31 between the conduit 27 and the inner tank wall 11, filling the annular space 31 and flowing upward toward the open upper end 16 of the inner tank. At the open upper end, the mixture is exposed to the head space 32 above the inner tank. Dispersed gases separate from the mixture and collect in the head space 32 while the degasified water overflows the edge of the upper end 16 of the inner tank, flowing radially outward into the annular space 33 between the inner and outer tanks. This annular space 33 is hereinafter referred to as the "outer annular space" to distinguish it from the "inner annular space" 31. The edge of the upper end of the inner tank serves as a weir or dam. In preferred embodiments of the invention, the weir is notched by a series of notches distributed along the edge, preferably evenly spaced around the circumference of the inner tank to assure that overflow water is evenly distributed around the tank circumference as it enters the outer annular space 33. The shape, size and number of notches is not critical to the invention, and the appropriate selection of these parameters will be readily apparent to anyone skilled in the arts of flow control and tank design.

Degasified water flows down the outer annular space 33 to the bottom of the outer tank 12, passes under the base of the inner tank 11 through the openings 18 in the skirt 17, and out of the tanks through the water outlet port 14. Gas in the head space 32 is released through the gas release port 13, the release being controlled by a float valve 34 which is governed by a level detector 35 inside the tank that detects the height of the water in the outer annular space 33. The level detector 35 is adjusted to open the float valve (which will then release gas from the head space) when the water level drops below a selected height and to close the float valve (and allow gas to collect in the head space) when the water level rises to a selected height. At the outlet of the float valve 34 is an ozone destruction unit 36 to decompose any residual ozone in the effluent gas to oxygen.

In certain preferred embodiments of the invention, a portion of the degasified water emerging from the water outlet port 14 is recycled by being bypassed through a recycle line 41 that joins the water feed to the external conduit 22. The point of entry of the recycle water is preferably upstream of both the pump 42 that supplies the water and the venturi 24 that injects the ozone.

The static mixers in the various sections of the conduit are conventional elements that are also commonly referred to as motionless mixers or in-line mixers. These are stationary, shaped diverters that reside and are immobilized in the conduit interior at one or more locations along the length of the conduit. These mixers force the fluid through a series of divisions and recombinations which mix the fluid as the fluid flows along its flow path. Examples of static mixers are the KENICS static mixer of Chemineer, Inc., Dayton, Ohio, USA; the SULZER static mixer of Koch Engineering Co., Inc., Wichita, Kans., USA; and various static mixers in the patent literature, such as that of U.S. Pat. No. 5,215,375, issued Jun. 1, 1993, to Ditzler et al., the disclosure of which is incorporated herein by reference. The static mixers can be placed in any straight conduit section.

In embodiments of the invention in which the upper end of the inner tank is a notched weir, the notches can assume any conventional shape, such as half-round, rectangular, or triangular (i.e., V-shaped). Triangular notches are preferred, particularly those that are sized and shaped such that water flow fills the notch to about 75% of its height under normal operation of the contact tank. It is also preferred that the float valve 34 and water level indicator 35 be adjusted to maintain a water level in the outer annular space 33 that is less than six inches (15 cm), preferably about 2 to about 4 inches (5 to 10 cm) below the lowest point of each notch.

In embodiments of the invention in which the treatment gas is ozone, the ozone can be generated on-site by a conventional ozone generator. Known generators include those that use electrical discharge into molecular oxygen, those that use ultraviolet light exposure of molecular oxygen, those involving high current density electrolysis of aqueous phosphate solutions, and those that irradiate gaseous or liquid oxygen with $\beta$- or $\gamma$-rays from radioactive isotopes or from a nuclear reactor. Generators based on electrical discharge are preferred. Examples of known ozone generators of this type include water- or air-cooled plate-type generators, water-cooled horizontal tube-type generators, and water-cooled or oil- and water-cooled vertical tube generators. Disclosures of ozone generators in the patent literature include those of U.S. Pat. Nos. 4,877,588 (Ditzler et al., issued Oct. 31, 1989) and 5,002,739 (Ditzler et al., Mar. 26, 1991), and pending U.S. Patent application Ser. No. 08/928,696 (Ditzler et al., filed Sep. 12, 1997), the disclosures of all of which are incorporated herein by reference.

The ozone destruction unit 36 serves to eliminate the hazards associated with the toxicity of ozone in the atmosphere, by decomposing ozone or converting it by chemical reaction to a non-toxic form. The destruction unit may operate by thermal decomposition, electron impact, reaction with oxygen molecules that are optionally in electronically or vibrationally excited form, by using the ozone as an oxidizing agent, or by exposing ozone to a catalyst that converts ozone to diatomic oxygen. Manganese dioxide is an example of such a catalyst. A packed bed of manganese dioxide particles can serve effectively as a flow-through ozone destruction unit. Care must be taken to avoid exposure of the manganese dioxide to water since this will result in agglomeration of the particles and restriction of gas flow. This can be achieved by passing the gas stream through a heater to raise the gas temperature and lower the relative humidity.

The tanks, conduits and other components of the apparatus can be manufactured from conventional materials of construction, provided that the materials are resistant or inert to the treatment gas. Stainless steel, FIBERGLAS®, and PVDF (polyvinyldifluoride) are examples of suitable materials. The capacities and dimensions of the inner and outer tanks may vary depending on the amount and flow rate of water to be treated as well as any other needs of the system. In most applications, best results will be achieved when the internal cross-section area ratio of the two tanks, outer-to-inner (i.e., total tank cross section area to inner tank cross section area), is from about 1.3:1 to about 4:1, preferably from about 1.6:1 to about 3:1, and most preferably from about 1.8:1 to about 2.2:1. A ratio of approximately 2:1 is presently preferred, providing approximately equal flow cross sections for the upflow in the inner annulus 31 and the downflow in the outer annulus 33.

The tanks are elongated cylinders, i.e., having heights exceeding their diameters. Preferably, the height:diameter ratio of the outer tank is within the range of from about 1.5:1 to about 10:1, and most preferably within the range of from about 2:1 to about 4:1. The combined tanks may be of any volumetric capacity, the size, as all dimensional parameters of the system, not being critical to the invention. In most applications, the combined tank volume will range from about 20 to about 10,000 gallons (75 to 38,000 liters), and preferably from about 100 to about 1,000 gallons (380 to 3,800 liters). The outer tank height in most applications will range from about 2 feet to about 50 feet (0.6 to 15 meters), and preferably from about 4 feet to about 20 feet (1.2 to 6 meters), and the diameter from about 1 foot to about 100 feet (0.3 to 300 meters), preferably from about 2 feet to about 10 feet (0.6 to 3 meters). The tanks can operate under elevated pressure, which may increase the solubility or rate of solution of the treatment gas in the water, thereby increasing the efficiency of the system.

The foregoing is offered primarily for purposes of illustration. It will be readily apparent to those skilled in the art that the materials, dimensions, operating procedures and conditions, and other parameters of the gas contact tanks described herein may be further modified or substituted in various ways without departing from the spirit and scope of the invention.

I claim:

1. Apparatus for treating water with a gaseous agent, said apparatus comprising:

an outer tank in the form of a closed elongated vertical cylinder;

an inner tank in the form of an elongated vertical cylinder with an open upper end, said inner tank positioned inside and coaxial with said outer tank, leaving a head space above said open upper end of said inner tank;

injector means external to said outer tank for injecting said gaseous agent into water;

a conduit communicating said injector means with said inner tank, said conduit passing through a wall of said outer tank to enter said inner tank through said upper opening and extending vertically downward inside said inner tank; said conduit containing static mixers to enhance the mixing of said gaseous agent in said water; said conduit, inner tank and outer tank thereby defining a flow path for water from said injector means, through said conduit to discharge to the bottom of said inner tank, then upward through a first annular space between said conduit and said inner tank, over said upper end, and downward through a second annular space between said inner and outer tanks;

treated water recovery means for drawing water from said outer tank downstream of said flow path; and gas releasing means for releasing gas from said head space in a controlled manner to maintain a liquid level in said outer tank at a selected position below said upper end of said inner tank.

2. Apparatus in accordance with claim 1 in which said open upper end of said inner tank is a notched weir containing notches distributed around the circumference of said inner tank.

3. Apparatus in accordance with claim 2 in which said gas releasing means comprises a float valve adapted to maintain a liquid level in said outer tank that is less than six inches below said notches.

4. Apparatus in accordance with claim 1 in which said outer and inner tanks have an internal cross-section area ratio, outer-to-inner, within the range of from about 1.3:1 to about 4:1.

5. Apparatus in accordance with claim 1 in which said outer and inner tanks have an internal cross-section area ratio, outer-to-inner, within the range of from about 1.6:1 to about 3:1.

6. Apparatus in accordance with claim 1 in which said outer and inner tanks have an internal cross-section area ratio, outer-to-inner, within the range of from about 1.8:1 to about 2.2:1.

7. Apparatus in accordance with claim 1 in which said outer and inner tanks have an internal cross-section area ratio, outer-to-inner, within the range of from about 1.8:1 to about 2.2:1, and said outer tank has a height:diameter within the range of from about 1.5:1 to about 10:1.

8. Apparatus in accordance with claim 1 in which said outer and inner tanks have an internal cross-section area ratio, outer-to-inner, within the range of from about 1.8:1 to about 2.2:1, and said outer tank has a height:diameter ratio within the range of from about 2:1 to about 4:1.

9. Apparatus in accordance with claim 1 in which said injector means comprises an ozone generator.

10. Apparatus in accordance with claim 1 in which said injector means comprises an ozone generator and said apparatus further comprises a particulate bed of manganese dioxide downstream of said gas releasing means to decompose ozone in said released gas.

11. Apparatus in accordance with claim 1 further comprising means for recirculating water from said treated water recovery means to said conduit upstream of said static mixers.

* * * * *